United States Patent [19]

Chapman et al.

[11] Patent Number: 5,409,622

[45] Date of Patent: * Apr. 25, 1995

[54] SURFACE LUBRICANT FOR OBJECTS CONTACTING FORMS OF WATER AND METHOD OF PREPARATION

[75] Inventors: Lloyd A. Chapman; Cressie E. Holcombe, Jr., both of Knox, Tenn.

[73] Assignee: Orpac, Inc., Oak Ridge, Tenn.

[*] Notice: The portion of the term of this patent subsequent to Jun. 14, 2011 has been disclaimed.

[21] Appl. No.: 192,843

[22] Filed: Feb. 7, 1994

[51] Int. Cl.⁶ ......................................... C10M 103/00
[52] U.S. Cl. ........................................ 252/25; 252/12; 252/18; 252/28; 252/49.6
[58] Field of Search ....................... 252/12, 18, 25, 28, 252/49.6

[56] References Cited

U.S. PATENT DOCUMENTS

| | | | |
|---|---|---|---|
| 3,097,561 | 7/1963 | Stein | 252/25 X |
| 3,909,424 | 9/1975 | Clark | 252/12 |
| 4,710,307 | 12/1987 | Périard et al. | 252/18 |
| 5,320,989 | 6/1994 | Chapman et al. | 501/98 |

FOREIGN PATENT DOCUMENTS 2110196  4/1990  Japan .

OTHER PUBLICATIONS

N. Sax, "Hawley's Condensed Chemical Dictionary"; Eleventh Edition, p. 164.

*Primary Examiner*—Prince Willis, Jr.
*Assistant Examiner*—Cephia D. Toomer
*Attorney, Agent, or Firm*—Pitts & Brittian

[57] ABSTRACT

A lubricant for the topical application to objects that will contact various forms of water, e.g., liquid, snow, ice, or mixtures thereof, to reduce friction and thereby increase speed, glide and maneuverability. The lubricant consists essentially of hexagonal boron nitride and a binder of single or mixed oxides or organics, the boron nitride content (after drying) being from about 36 wt. % to about 99 wt. %. Binders of particular interest are water-based colloidal aluminum oxide and colloidal silicon dioxide. This lubricant is suitable for topical applications in a thin layer to various sports objects, such as skis, snowboards, ice skates, snowmobiles, toboggans, sleds, boats, etc., where reduced friction, and thus higher speed, glide and maneuverability is desired. Although a solid stick form (by drying or pressure-less sintering) is preferred, the lubricant can be in the form of a paste or a powder. Further, this lubricant can be incorporated into waxes of the type previously used for friction reduction to obtain the benefit of both.

23 Claims, No Drawings

SURFACE LUBRICANT FOR OBJECTS CONTACTING FORMS OF WATER AND METHOD OF PREPARATION

TECHNICAL FIELD

The present invention relates generally to lubricants and their preparation, and more particularly to lubricants that are topically applied to objects to be in contact with various forms of water, such as bodies of water, snow, ice, mud or combinations thereof, so as to reduce friction between those objects and the various forms of water by users of the treated objects thereby increasing speed, maneuverability, etc. These objects include such devices as skis, toboggans, luges, sleds, snowboards, ice skates, snowmobiles, etc. Additionally, the lubricant can reduce the adherence of these water-like materials to surfaces, such as shovels, plows, etc., as well as for other lubricating applications in freezing climate conditions where snow, ice and slush are common.

BACKGROUND ART

It is conventional practice in recreation involving the various forms of water (as liquid, partly liquid (slush) or solid as ice or snow, to apply a topical coating of a wax or similar material to reduce friction. For example, wax is usually applied to the contact surface of snow skis or toboggans to increase speed across the snow. Typical of the commercial waxes utilized for this purpose are: "Twist Wax" of Toko AG, CH-9450 Altstatten, Switzerland; "Speed Cote" of Sandaro Industries, Inc., Novato Calif. 94949; "SWIX Super F4" of Swix Sport, 2601 Lillehammer, Norway; and "Maxiglide" sold by Maxiglide Products, Inc., State College, Pa. 16801. The same treatment is also utilized for luge devices and other devices having runners. This wax, some times requiring heat, is periodically renewed as the abrasion occurring during contact gradually reduces the effect. Similar repeated applications are made of a wax or similar material to boat hulls, water skis, etc. in contact with the liquid form of water. In all instances, using known products, the wax must be applied to a completely dry surface. This prevents any treatment "in-the-field" where the surface is usually moist.

Accordingly, it is an object of the present invention to provide a surface lubricant for improved reduction of friction between objects and various forms of water, including liquid form, ice, snow and/or combinations thereof, that can be applied to the object even when moist in the field.

It is another object of the present invention to provide an improved surface lubricant for skis, toboggans, sleds, snowboards, ice skates, etc., to enhance speed, glide, and maneuverability across the various forms of water by a user of these devices.

An additional object of the present invention is to provide a surface lubricant that reduces cling of frozen or partly frozen water, e.g., snow, slush, etc., to tools used for the handling of these water forms, the tools including, for example, snow shovels, snow plows, etc.

A further object of the present invention is to provide a hexagonal BN-based composition for use as a surface lubricant to be topically applied to objects that are to contact various forms of water, such as snow, ice, liquid water, and combinations thereof.

Yet another object of the present invention is to provide a surface lubricant in a convenient form so as to be readily applied to surfaces of objects in contact with various forms of water, the lubricant being a BN-based composition.

Also, it is an object of the present invention to provide a lubricant composition that is white, in contrast to a color that would streak snow, ice or other of the surfaces, and that can be removed from clothing and other objects by thorough washing.

In addition, it is an object of the present invention to provide a method of preparing a lubricant for these uses that is in either a paste, a powder or a stick form.

These and other objects of the present invention will become apparent upon a consideration of the detailed description given hereinafter.

Summary of the Invention

In accordance with the present invention, there is provided a lubricant composition consisting of over 50 vol. % boron nitride (hexagonal), with the remainder of the composition being bonding agents comprised of single or mixed oxides or organics, the boron nitride composition being from about 36 wt. % to about 99 wt. %. This lubricant is suitable for topical applications in a thin layer to various sports objects, such as skis, snow boards, toboggans, sleds, ice skates, boats, etc., where reduced friction, and thus higher speed, is desired. In addition to increasing speed, greatly improved glide (forward motion that results from a push-off) occurs. Also, since drag is reduced, directional change (maneuverability) is facilitated. Although a "stick" form is preferred for ease of field application without soiling clothing or hands (when the stick is provided with a case enclosure), the lubricant can be in the form of a paste or a powder. Further, the lubricant of the present invention can be incorporated into waxes of the type previously used for friction reduction to obtain the benefit of both. Other uses include application to tools used for removing snow, etc., such as shovels and plows, and the lubricant is suitable for many applications in freezing climates where the frozen forms of water are common. The white appearance and cleanability of the lubricant are of particular value.

BEST MODE FOR CARRYING OUT THE INVENTION

Hexagonal boron nitride is known to be lubricious; i.e., having a very low coefficient of friction. However, it cannot be formed into any type of "body" without the use of extreme pressures and temperatures. Further, it has been a common understanding that water-carrying boron nitride would be too easily removed for water-involved uses.

However, it has been found that such boron nitride can be bonded with aluminum oxide, as described in co-pending U.S. patent application Ser. No. 07/986,548, filed Dec. 7, 1992, of a common assignee. Further, other binders are suitable for incorporating boron nitride, such as cellulosic binders (sodium carboxymethyl-cellulose, hydroxypropylcellulose, etc.), or refined bentonite or hectorite. Also, other colloidal binders (namely colloidal silica), mixed oxide binders (such as sodium silicate, potassium silicate, and lithium silicate solutions), and conventional colloidal suspensions or aqueous binder solutions are suitable for use with the boron nitride.

A suitable paste form of a topically-applied lubricant for objects in contact with various forms of water is prepared by mixing 75 g. of colloidal aluminum oxide (typically Nyacol AL-20 watery liquid, as obtained from Nyacol Products, Inc. of Ashland, Mass., containing 20 wt. % aluminum oxide and 80 wt. % water) with 85 g. of finely divided boron nitride (hexagonal form) powder. As used herein, "colloidal" refers to small particles, typically equal to or less than 0.05 micrometers (500 Angstroms), dispersed in water as sols or hydrosols. The BN powder was about two to four micrometers in particulate size, and had a surface area typically about five to ten m$^2$g. This composition produced a mixture that had a plastic consistency (i.e., a paste), like a thick clay-like mass. The resultant paste can be consolidated to further densify the paste by any suitable means, as with a pug mill, and any air can be removed by a vacuum pug mill, as will be known by persons skilled in the art. Although the paste/clay-like material can be used as a lubricant in this state, the product can also be allowed to completely dry at about room temperature. This results in a solid mass absent any cracks, the mass then being suitable to use as a dry lubricant.

Although the product after room temperature drying still contains some bound water, it otherwise consists essentially of only the hexagonal BN and the aluminum oxide. While such a body is useful for lubricant applications, further processing can be carried out by pressureless sintering. For example, the product of the air drying can be subjected to a slow heating step. Above about 500° C., all volatiles (primarily moisture) were removed. The product at this point was essentially 15 wt. % aluminum oxide and 85 wt. % BN. The sintering temperature upper limit is about 900° C. in air so as to prevent the formation of aluminum borate due to the oxidation of the hexagonal BN and the reaction with aluminum oxide.

During this pressureless sintering, and even during the initial drying step, there is very little shrinkage of a formed body. Thus, a body for use in the application of the lubricant remains principally in the shape it was originally formed, e.g., in a rectangular or cylindrical stick (an elongated body). Although a strong tough body results, the density is typically a relatively low 50 to 70% (porosity is 30 to 50%). The sintered material is white and marks easily, like chalk, in contrast to hot-pressed boron nitride bodies. This chalk-like property allows ready surface marking of the bottoms of skis, ice skates, etc.

This method of preparing a BN-aluminum oxide product has been disclosed in the above-cited co-pending patent application Ser. No. 07/986,548. As discussed therein, other compositions of the hexagonal boron nitride and aluminum oxide are formed in a similar manner, with the boron nitride being present in the dried or pressureless sintered material at a level above 50 vol. %, specifically from about 36 wt. % to about 95 wt. %, with the aluminum oxide then having a range from 5 wt. % to 64 wt. %.

A typical starting composition to yield 36 wt. % BN (minimum amount of BN to yield 50 vol. % in the final product) is 36 g. of hexagonal BN and 320 g. of colloidal aluminum oxide, since the colloidal aluminum oxide has 20% aluminum oxide when totally dehydrated. Likewise, the starting composition for 95 wt. % BN is 95 g. of hexagonal BN and 25 g. of colloidal aluminum oxide plus enough additional water to form a paste/clay-like mass.

For other inorganic binders (e.g., colloidal silicon dioxide, alkali {lithium, sodium, potassium} silicates, bentonite or hectorite), the amount of the dehydrated oxide or mixed oxide must be such that there is 36 wt. % BN in the dried or sintered material. For organic binders, such as the cellulosics, typically only a low percentage is dissolved in water such that the BN content will be high, possibly up to 99 wt. %.

A similar method can be used to form a lubricant of BN with silica as the binder. For example, a suitable paste lubricant was prepared by mixing 25 g. of colloidal silicon dioxide (typically Nyacol 830 watery liquid, containing 30 wt. % silicon dioxide and 70 wt. % water) with 85 g. finely divided hexagonal boron nitride and 36 g. water. The boron nitride was the same as utilized for the lubricant containing alumina. The resultant paste material can be used as a lubricant in this state, or it can be dried as with the alumina-containing composition. Further, the lubricant can be pressureless-sintered in a range of about 500° to 900° C., with essentially all volatile material being removed above 500° C. After the sintering, the product consists essentially of 8 wt. % silica and 92 wt. % BN. The lubricant can be formed into any shape that will be useful for its application.

A corresponding lubricant can be formed also using a mixture of the colloidal alumina and colloidal silica. The same drying, sintering and forming procedures can be used.

Sintering temperature should not exceed an upper limit of about 900° C. in air to avoid BN reacting to form boric oxide and then reacting with other oxides or mixed oxides. This negates any lubricity of the BN. The sintered products are preferred to dried products in areas where marking onto damp or wet surfaces (skis, skates, etc.) is likely to occur. This prevents crumbling of the "stick".

Although a stick form of the lubricant appears presently to be preferred for the form of application to skis and skate and sled runners, the paste form may be preferred for the application to larger surfaces, e.g., snow boards, canoe, kayak, boat and like hulls.

After the drying or sintering stages of processing, the product can be reduced to powder form. As such, it can be applied to a cloth to be wiped upon the surface where reduced friction is desired. Also, a cloth can be chalk-marked to be used for polishing a surface. Further, this form of the lubricant can be applied via an aerosol onto the surface and then buffed by hand rubbing. Similarly, the powder form of the lubricant can be incorporated into a wax or other "body" for application to the surface to provide the improved lubricity. The stick form of the product (preferably the sintered material) can be marked directly onto the surface to be treated and that surface can be polished, if desired.

Application of an alumina-based lubricant prepared according to the above was made in a thin coat to the bottom of waxed snow skis. The following application techniques were used successfully over wet or dry skis:

1) sintered stick was rubbed onto a polishing cloth which was then used to wipe the skis;
2) sintered stick was rubbed onto the skis, and then a polishing cloth was used to wipe (or smear) the lubricant onto the skis;
3) sintered stick was marked (scribed or X-ed) over the skis, and no cloth or polishing was used;
4) paste was rubbed (or smeared) over the surface of the skis with a small sponge.

Substantially reduced friction was observed as even as compared to conventional ski wax with the result of increased speed. Also, and importantly, enhanced glide and improved maneuverability occurred from the lack of drag on the ski bottoms. The user reported that the improved performance in maneuverability of skis having the lubricant was like the improvement of power steering of a vehicle as compared to mechanical steering. The lubricant had a limited life and needed to be re-applied occasionally, e.g., after 3–5 down-hill runs.

Any of the above-listed application techniques can be done before skiing or "in the field" while being out on the slopes. Only a very small quantity of the lubricant would have to be carried by the skier. Accordingly, the present invention is one for topical in-the-field application to the surface whether the surface is dry or wet, waxed or unwaxed.

A thin application of the alumina-containing lubricant was applied to the blades of ice skates. The improvement over untreated blades was very noticeable, particularly on ice surfaces that had become "cut" or rough and thus powdery by prior skating activity. The glide was at least double for skates using the lubricant as compared to skates without the lubricant. Periodic re-application with the sintered stick lubricant merely chalked over the runners maintained the improved reduction of friction to enhance glide over the ice.

Although a 15:85 wt. % $Al_2O_3$:BN composition is described above, similar results will be achieved with hexagonal BN concentrations ranging from about 36 wt. % to about 95 wt. % when dried, with the remainder of the composition being bonding agents comprised of single or mixed oxides or organics.

Colloidal aluminum oxide is one principal oxide used with the lubricant; however, the invention is not limited to any one particular source of the aluminum oxide. For example, as disclosed in the afore-cited patent application Ser. No. 07/986,548, the BN can be mixed with a peptized aluminum oxide monohydrate monohydrate liquid prepared by mixing 5 g. of aluminum oxide monohydrate into 75 g. of water and adding 2.5 g. of concentrated nitric acid while stirring. This peptizing is well known in the art as means to create a dispersed phase of ultrafine particulate material similar to, but different than colloidal material. Further, the aluminum oxide for the preparation of the lubricant can be an aluminum salt that can be converted to aluminum oxide at temperatures about 500°–900° C. (e.g., during the sintering step). Such a salt is aluminum nitrate. In contrast, however, it appeared that a 0.05 micrometer powder of polishing grade aluminum oxide will not provide the necessary coating of the BN so as to provide sufficient cohesiveness (lack of bonding) to form a body as for the formation of a stick form of the lubricant.

From the foregoing, it will be understood by persons skilled in the art that the present invention provides a surface lubricant for topical applications to objects used by sport enthusiasts where these objects are in contact with various forms of water, such as liquid water, ice, snow or combinations thereof. Thus, it is useful for application upon skis, sleds, luges, toboggans, and hulls of boats, canoes, kayaks, etc. to increase speed, glide and maneuverability across these forms of water. Additionally, the invention can be used for reducing the cling and adherence of waterborne materials to scraping surfaces such as shovels, plows, etc. Other applications will be found in freezing climates where the frozen or semi-frozen forms of water are common. The lubricant is white and, as such, with not streak or otherwise show on snow or ice, and it is easily removed from clothing by thorough washing.

Although specific physical forms of the lubricant have been discussed, this is not for the purpose of limiting the invention. Rather, the invention is to be limited only by the appended claims and their equivalents.

We claim:

1. A lubricant for topical application to surfaces of recreational equipment intended for contact with various forms of water to reduce friction between said surfaces and said forms of water, the lubricant comprising an intimate mixture containing at least 50 vol. % finely-divided hexagonal boron nitride powder, water, and a binder selected from the group consisting of cellulosics, bentonite, hectorite, colloidal oxides, alkali silicates and aluminum oxide, said aluminum oxide derived from the group consisting of water based colloidal aluminum oxide, peptized aluminum oxide and an aqueous solution of an aluminum salt that can be converted to aluminum oxide by heating to a temperature of about 500°–900° C., said intimate mixture being a paste.

2. The lubricant of claim 1 wherein said paste is consolidated to form a body and said body is dried to remove substantially all water, said dried body containing hexagonal boron nitride in a range of 36 to 99 wt. %.

3. The lubricant of claim 1 wherein said intimate mixture is pressureless-sintered into a body at about 500° to about 900° C. to remove volatile components, and contains hexagonal boron nitride in a range of 36 to 95 wt. %.

4. The lubricant of claim 1 wherein said binder is an aluminum oxide selected from the group consisting of water-based colloidal aluminum oxide, peptized aluminum oxide and an aqueous solution of an aluminum salt that can be converted to aluminum oxide by heating to a temperature of about 500°–900° C.

5. The lubricant of claim 4 wherein said binder is aluminum oxide derived from water-based colloidal aluminum oxide.

6. The lubricant of claim 1 wherein said binder is colloidal silicon dioxide.

7. The lubricant of claim 6 wherein said intimate mixture is dried and pressureless-sintered into a body at 500° to 900° C., and said product of sintering consists essentially of 8 wt. % silica and 92 wt. % boron nitride.

8. The lubricant of claim 1 wherein said finely-divided hexagonal boron nitride has a particulate size of about two to about 4 micrometers and a surface area of about five to about ten $m^2/g$.

9. A lubricant body for topical application of a lubricant to surfaces of recreational equipment intended for contact with various forms of water to reduce friction between said surfaces and said forms of water, said lubricant body comprising a product produced by the steps:

forming an intimate mixture of finely-divided hexagonal boron nitride powder, water, and a binder selected from the group consisting of cellulosics, bentonite, colloidal oxides, alkali silicates, hectorite and aluminum oxide, said aluminum oxide derived from the group consisting of water-based colloidal aluminum oxide, peptized aluminum oxide and an aqueous solution of an aluminum salt that can be converted to aluminum oxide by heating to a temperature of about 500°–900° C.;

forming said intimate mixture into said body; and drying said formed body to substantially remove all water, said dried body containing hexagonal boron nitride in a range of 36 to 95 wt. %.

10. The lubricant body of claim 9 wherein said aluminum oxide is derived from water-based colloidal aluminum oxide, peptized aluminum oxide and an aqueous solution of an aluminum salt that can be converted to aluminum oxide by heating to a temperature of about 500°–900° C.

11. The lubricant of claim 9 wherein said binder is colloidal silicon dioxide.

12. The lubricant body of claim 9 wherein said formed lubricant body is pressure-less sintered at a temperature of about 500° to about 900° C., and said hexagonal boron nitride is in a range of 36 to 95 wt. %.

13. The lubricant body of claim 9 wherein said hexagonal boron nitride has a particulate size of about two to about four micrometers and a surface area of about five to about ten $m^2/g$.

14. The lubricant body of claim 9 wherein said hexagonal boron nitride is present at about 85 wt. %, said aluminum oxide being present at about 15 wt. %.

15. A method of preparing a lubricant for topical application to surfaces of recreational equipment intended for contact with various forms of water to reduce friction between said surfaces and said forms of water, said method comprising preparing a paste from an intimate mixture of finely-divided hexagonal boron nitride powder and a binder of aluminum oxide, said aluminum oxide derived from water-based colloidal aluminum oxide.

16. The method of claim 15 further comprising the step of drying said paste of said intimate mixture to remove substantially all water to form an uncracked dry body containing said hexagonal boron nitride.

17. The method of claim 15 further comprising the steps:
    shaping said paste into an elongated body;
    drying said body to substantially remove all water; and
    pressure-less sintering said dried body at a temperature of about 500°–900° C.

18. The method of claim 15 wherein said finely-divided hexagonal boron nitride has a particulate size of about two to about 4 micrometers and a surface area of about five to about ten $m^2/g$.

19. A method for reducing friction of surfaces of objects intended for contact with various forms of water which comprises the step of applying to at least a portion of said surfaces of said objects a lubricant comprising an intimate mixture of:
    at least 50 vol. % finely divided hexagonal boron nitride powder; and
    an aqueous binder selected from the group consisting of cellulosics, bentonite, hectorite, colloidal oxides, alkali silicates, and aluminum oxide, said aluminum oxide derived from the group consisting of water based colloidal aluminum oxide, peptized aluminum oxide and an aqueous solution of an aluminum salt that can be converted to aluminum oxide by heating to a temperature of about 500°–900° C.;
    wherein said intimate mixture is a paste.

20. The method of claim 19 wherein said paste is formed into a body and dried to remove substantially all water prior to application of said lubricant to said at least a portion of said surfaces of said objects.

21. The method of claim 20 wherein said dried body is pressure-less sintered prior to application of said lubricant to said at least a portion of said surfaces of said objects, said lubricant containing about 36 to 95 wt. % hexagonal boron nitride after said sintering.

22. A lubricant body for topical application of a lubricant to surfaces of recreational objects intended for contact with various forms of water to reduce friction between said surfaces and said forms of water, said lubricant body comprising a product produced by:
    forming a paste from an intimate mixture of finely-divided hexagonal boron nitride powder and colloidal silicon dioxide;
    forming said paste into a shape;
    drying said shape to remove substantially all water; and
    pressureless-sintering said shape to form said lubricant body, said lubricant body consisting essentially of 8 wt. % silica and 92 wt. % hexagonal boron nitride.

23. The method of claim 22 wherein said finely-divided hexagonal boron nitride has a particulate size of about two to about 4 micrometers and a surface area of about five to about ten $m^2/g$.

* * * * *